US012021332B2

(12) United States Patent
Yaworski et al.

(10) Patent No.: US 12,021,332 B2
(45) Date of Patent: Jun. 25, 2024

(54) APPARATUS AND METHODS FOR MONITORING THE TEMPERATURE OF HIGH VOLTAGE ELECTRICAL CABLE CONNECTORS

(71) Applicants: TE Connectivity Solutions GmbH, Schaffhausen (CH); TE Connectivity Ireland Limited, Dublin (IE); Tyco Electronics UK Ltd., Swindon (GB)

(72) Inventors: Harry George Yaworski, Holly Springs, NC (US); Brendan Normoyle, Castlemahon (IE); Jonathan Roberts, Doddington (GB); Cristian S. Regus, Union City, CA (US); Stephen Wiseman, Wisbech (GB)

(73) Assignee: TE CONNECTIVITY SOLUTIONS GMBH ET AL., Schaffhausen (CH)

( * ) Notice: Subject to any disclaimer, the term of this patent is extended or adjusted under 35 U.S.C. 154(b) by 44 days.

(21) Appl. No.: 17/816,140

(22) Filed: Jul. 29, 2022

(65) Prior Publication Data

US 2024/0039218 A1    Feb. 1, 2024

(51) Int. Cl.
*H01R 13/66*  (2006.01)
*G01K 1/024*  (2021.01)

(52) U.S. Cl.
CPC ......... *H01R 13/6683* (2013.01); *G01K 1/024* (2013.01)

(58) Field of Classification Search
None
See application file for complete search history.

(56) References Cited

U.S. PATENT DOCUMENTS

| 1,763,873 | A | * | 6/1930 | Weston | H01B 11/00 |
| | | | | | 174/32 |
| 3,566,691 | A | * | 3/1971 | Halpern et al. | G01K 1/024 |
| | | | | | 374/E1.004 |
| 7,306,489 | B2 | * | 12/2007 | Werthman | H01Q 1/2225 |
| | | | | | 439/620.01 |
| 7,336,202 | B2 | * | 2/2008 | Kawai | G01K 1/02 |
| | | | | | 340/870.07 |
| 7,461,972 | B2 | * | 12/2008 | Cohen | G01K 1/14 |
| | | | | | 374/E1.004 |
| 9,652,707 | B2 | * | 5/2017 | Downie | G06K 19/07749 |
| 9,652,708 | B2 | * | 5/2017 | Downie | G06K 19/0717 |
| 10,643,040 | B2 | * | 5/2020 | Ostermeier | G01D 11/00 |
| 11,170,385 | B2 | * | 11/2021 | Hong | G06F 21/60 |

(Continued)

FOREIGN PATENT DOCUMENTS

CN    114018420 A    2/2022
EP    0087267 A1    8/1983

OTHER PUBLICATIONS

Extended European Search Report, European Application No. 23186084. 2-1001, European Filing Date, dated Dec. 8, 2023.

*Primary Examiner* — Carlos Garcia (57) ABSTRACT

A connector terminating an end of an electrical cable includes an outer surface, and a radio frequency (RF) sensor tag is secured to the connector outer surface and includes a temperature sensor and an antenna. In response to the RF sensor tag receiving an interrogation signal from a remote RF reader, the temperature sensor is configured to detect a temperature of the connector and generate a temperature data signal, and the antenna is configured to transmit the temperature data signal to the remote RF reader.

19 Claims, 11 Drawing Sheets

(56) References Cited

U.S. PATENT DOCUMENTS

| | | | |
|---|---|---|---|
| 11,255,735 B2* | 2/2022 | Engelstad | G01K 1/024 |
| 11,315,003 B2* | 4/2022 | Finn | G06K 19/07794 |
| 2004/0178925 A1* | 9/2004 | Kawai | G01K 1/02 |
| | | | 374/E1.002 |
| 2005/0285735 A1* | 12/2005 | Imura | A47J 45/068 |
| | | | 340/539.27 |
| 2006/0019540 A1* | 1/2006 | Werthman | G06K 19/0717 |
| | | | 374/E1.018 |
| 2006/0202821 A1* | 9/2006 | Cohen | G06K 19/0723 |
| | | | 73/146 |
| 2011/0050164 A1* | 3/2011 | Partovi | H02J 50/90 |
| | | | 320/108 |
| 2012/0126949 A1* | 5/2012 | Downie | G06K 19/07749 |
| | | | 340/10.1 |
| 2012/0126950 A1* | 5/2012 | Downie | G02B 6/3895 |
| | | | 340/10.1 |
| 2012/0133490 A1* | 5/2012 | Downie | G06K 19/0717 |
| | | | 340/10.1 |
| 2017/0040665 A1* | 2/2017 | Takashima | H01Q 1/2291 |
| 2019/0197269 A1* | 6/2019 | Ostermeier | F26B 5/06 |
| 2019/0316969 A1 | 10/2019 | Zhang et al. | |
| 2019/0370823 A1* | 12/2019 | Hong | G06Q 30/0185 |
| 2023/0155335 A1* | 5/2023 | Stewart | F21S 4/10 |
| | | | 439/753 |

* cited by examiner

APPARATUS AND METHODS FOR MONITORING THE TEMPERATURE OF HIGH VOLTAGE ELECTRICAL CABLE CONNECTORS

FIELD

The present inventive concept relates generally to electrical connectors and, more particularly, to electrical connectors for high voltage electrical cables.

BACKGROUND

It is known to provide an inline, L-shaped, or T-shaped adapter to connect a high voltage electrical cable (e.g., one rated at above about 1 kV) to a transformer, for example. The adapter usually has one inwardly-tapering socket in one arm thereof that is a push fit onto a bushing of the transformer, and receives the terminated end of the electrical cable in another arm aligned with or at right angles thereto. The socket has an electrical contact (male or female) for cooperating with the contact (respectively female or male) of the bushing. The electrical cable may be a push-fit into the other arm, or it may be connected externally of the adapter to a terminal that is molded thereinto, as disclosed in a European Patent Application Publication No. 87267. Other adapters, usually of T-shape, have the bushing and cable arms at right angles to each other, and a further arm with a socket aligned with the bushing arm. Such further arm is closed by a removable plug that may allow access to connect the cable mechanically and electrically to the bushing.

It is desirable to measure the temperature of high voltage electrical cable connectors in order to detect whether a connector may be overheating, which can lead to failure. Thermocouples have conventionally been used to measure connector temperatures. Unfortunately, it may be difficult to connect a thermocouple wire to an energized cable accessory as it may cause a short circuit. In addition, Infrared (IR) cameras have been used to measure connector temperatures. Unfortunately, typical high voltage connectors are hidden beneath the thick insulation of a cable accessory. As such, a direct temperature reading via an IR camera may be difficult to obtain.

SUMMARY

According to some embodiments of the present inventive concept, a radio frequency (RF) sensor tag, including a temperature sensor and an antenna, is directly mounted to a connector in a medium or high voltage cable accessory. The RF sensor tag is coupled to an RF reader which is mounted in proximity of the RF sensor tag, but external to the cable accessory. The reader provides wireless power to the tag which accumulates and stores energy in small onboard capacitors. NFC protocol based on NFC standards ISO/IEC 14443 and ISO/IEC 18000-3 enables wireless communication between the sensor tag and reader.

According to some embodiments of the present inventive concept, a cable connection assembly includes an adaptor body and a terminated electrical cable end received within the adaptor body. The electrical cable end is terminated by a connector, such as a cable lug. An RF sensor tag is secured to the connector, and includes a temperature sensor and an antenna. An RF reader is externally mounted on the adaptor body and is configured to transmit an interrogation signal to the RF sensor tag. The interrogation signal provides power to the RF sensor tag and causes the temperature sensor to detect a temperature of the connector and generate a temperature data signal, and causes the antenna to transmit the temperature data signal. The RF reader is configured to receive the transmitted temperature data signal and transmit the received temperature data signal to a remote device, such as a smart phone or other computing device. In some embodiments, the RF reader may be configured to display an indication (e.g., one or more colors, etc.) of a temperature of the connector in response to receiving the temperature data signal.

In some embodiments, an outer surface of the connector comprises a recessed portion formed therein, and the temperature sensor is positioned within the recessed portion. The recessed portion acts as a pocket to mechanically protect the temperature sensor and to facilitate insertion of the terminated end of the electrical cable within the adapter body. In some embodiments, an outer surface of the temperature sensor does not extend above the outer surface of the connector. The antenna is a flexible antenna that is secured to and conforms with an outer surface of the connector and is positioned adjacent the temperature sensor.

In some embodiments, the antenna includes a shield configured to reduce electromagnetic interference from the electrical cable. The shield includes a layer of ferrite, such as a nickel-zinc ferrite or a manganese-zinc ferrite, and a layer of metallic material, such as steel. The layer of metallic material is adjacent to the outer surface of the connector and the ferrite layer is between the layer of metallic material and the antenna.

In some embodiments, the RF reader is configured to adjust a frequency of the interrogation signal based on a temperature of the connector.

In some embodiments, the RF sensor tag is configured to automatically adjust its operating or resonating frequency in response to a temperature of the connector detected by the temperature sensor.

According to some embodiments of the present inventive concept, a connector terminating an end of an electrical cable includes an outer surface, and an RF sensor tag is secured to the connector outer surface and includes a temperature sensor and an antenna. In response to the RF sensor tag receiving an interrogation signal from a remote RF reader, the temperature sensor is configured to detect a temperature of the connector and generate a temperature data signal, and the antenna is configured to transmit the temperature data signal to the remote RF reader.

In some embodiments, an outer surface of the connector has a recessed portion formed therein, and the temperature sensor is positioned within the recessed portion. The recessed portion acts as a pocket to mechanically protect the temperature sensor. The antenna is a flexible antenna that is secured to and conforms with an outer surface of the connector. The antenna includes a shield configured to reduce electromagnetic interference. The shield includes a layer of ferrite and a layer of metallic material.

In some embodiments, the RF sensor tag is configured to automatically adjust its operating frequency in response to a temperature of the connector detected by the temperature sensor.

According to some embodiments of the present inventive concept, a method of monitoring a temperature of a connector terminating an end of an electrical cable is provided. The connector is surrounded by an insulative adaptor body and an RF sensor tag is secured to the connector. The RF sensor tag includes a temperature sensor and an antenna. The method includes transmitting an interrogation signal to the RF sensor tag from an RF reader located external to the adaptor body that provides power to the RF sensor tag and causes the temperature sensor to detect a temperature of the connector and generate a temperature data signal, and the antenna to transmit the temperature data signal; and receiving the transmitted data signal at the RF reader. The method may include transmitting the received temperature data signal from the RF reader to a remote device. In some embodiments, the method may include adjusting an operating frequency of the RF sensor tag in response to a temperature of the connector detected by the temperature sensor. In some embodiments, the RF sensor tag may be configured to automatically adjust its operating frequency in response to the temperature of the connector detected by the temperature sensor.

Embodiments of the present inventive concept are advantageous over conventional temperature measurement methods in that temperature data from an electrical cable connector can be wirelessly exported through the thick insulation of a cable accessory to a reader located external to the cable accessory. The temperature data can then be sent to a user who can make a decision whether to repair or replace the connector based on the temperature magnitude, trend, and duration data obtained.

Wireless temperature sensors according to the present inventive concept can directly and accurately measure connector temperatures within medium and high voltage cable accessories. These sensors can provide temperature data that can be used to detect connectors which are in the early stages of overheating. This allows a technician to repair the connector and cable accessory before failure. As such, an electric utility can avoid a catastrophic failure and an unexpected outage which entails costly repairs and loss of power for consumers.

Moreover, the design of the temperature sensor allows RF communication techniques to operate in the presence of high magnetic and electrical fields found within a connector of medium and high voltage electrical cables. The temperature sensing electronics are located within a pocket machined within an outer surface of a connector and a shield of ferrite and steel behind the antenna coil reduces the effect of nearby metals on the antenna.

The low-profile RF sensor tag of the present inventive concept does not affect the electrical insulation or environmental protection of an electrical cable. The sensor is placed in contact with the element where temperature is measured and is covered by the same electrical insulation the connector would normally have. No wires or cables breach the insulation, which is unimpaired, thereby maintaining the environmental and electrical integrity of the cable connection assembly/cable accessory. This is an important advantage of the present inventive concept over conventional temperature measurement techniques. The present inventive concept allows information to be retrieved from within a cable connection assembly/cable accessory while allowing the cable connection assembly/cable accessory to remain undisturbed. In addition, the readers can be daisy-chained, allowing data to be collected from three (or more) phases simultaneously, thereby allowing the collected data to highlight differences between phases, or trends common to all phases.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present inventive concept. The drawings and description together serve to fully explain embodiments of the present inventive concept.

DETAILED DESCRIPTION

Figure 1:
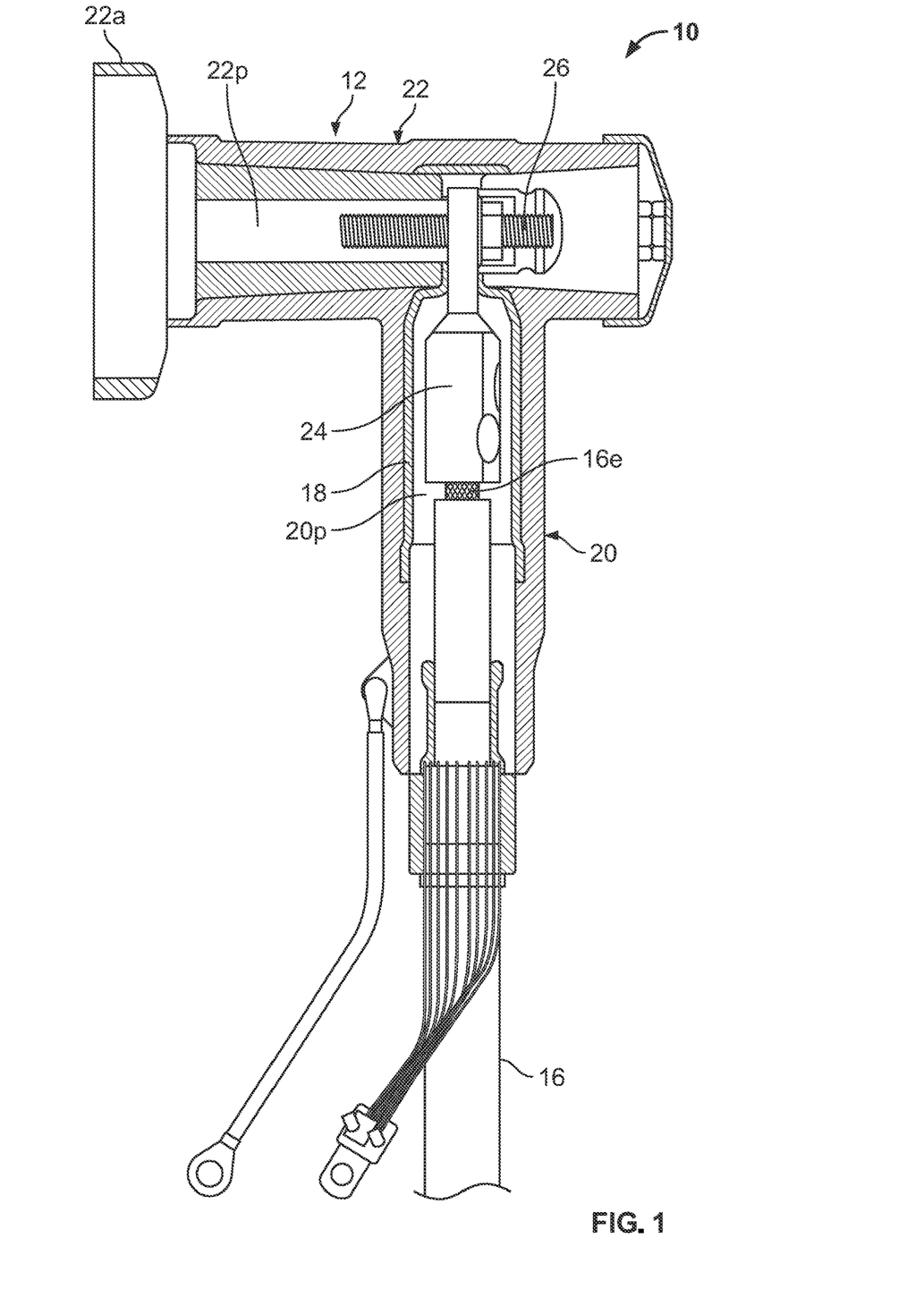
FIG. 1 is a cut-away view of a cable connection assembly in which embodiments of the present inventive concept may be implemented.

FIG. 1 is a cut-away view of an exemplary cable connection assembly 10 in which embodiments of the present inventive concept may be implemented. However, embodiments of the present inventive concept may be utilized with many different cable connection assemblies and accessories. Embodiments of the present inventive concept are not limited to the illustrated cable connection assembly 10. The illustrated cable connection assembly 10 includes an adapter body 12 configured to receive the terminated end of an electrical cable 16. The cable connection assembly 10 may be used to terminate and environmentally protect the electrical cable 16 and to enable physical and electrical connection between the electrical cable 16 and a termination (e.g., a bushing) of associated electrical equipment, such as switchgear, a transformer, etc. The electrical cable 16 may be, for example, a medium-voltage (e.g., between about 5 and 35 kV) or high-voltage (e.g., between about 46 and 230 kV) power transmission cable.

The illustrated adaptor body 12 is formed of a resilient, electrically insulating material, such as, for example, ethylene propylene diene monomer (EPDM) rubber, neoprene or other rubber, and is T-shaped with a tubular main leg 20 and a tubular cross leg 22. The main leg 20 and cross leg 22 define respective intersecting first and second inner passageways 20*p*, 22*p*. A metal layer 18 is molded into, or otherwise included in, the adaptor body 12 and serves as a Faraday cage that reduces electromagnetic interference emanating from the electrical cable 16.

The first passageway 20*p* is configured to receive the terminated end of the electrical cable 16 therein, as illustrated. The end of the electrical cable 16 is terminated by a connector 24, such as a cable lug. The second passageway 22*p* has a frusto-conical configuration and is configured to receive a mating frusto-conical bushing of electrical equipment, such as switchgear, a transformer, etc. The second passageway 22*p* includes a pin 26 that engages the connector 24 and that is configured to make electrical contact with the electrical equipment bushing, as would be understood by one skilled in the art. The outermost portion 22*a* of the cross leg 22 is flanged to enhance the mechanical connection onto a bushing of the electrical equipment, as would be understood by one skilled in the art.

Figure 2A:
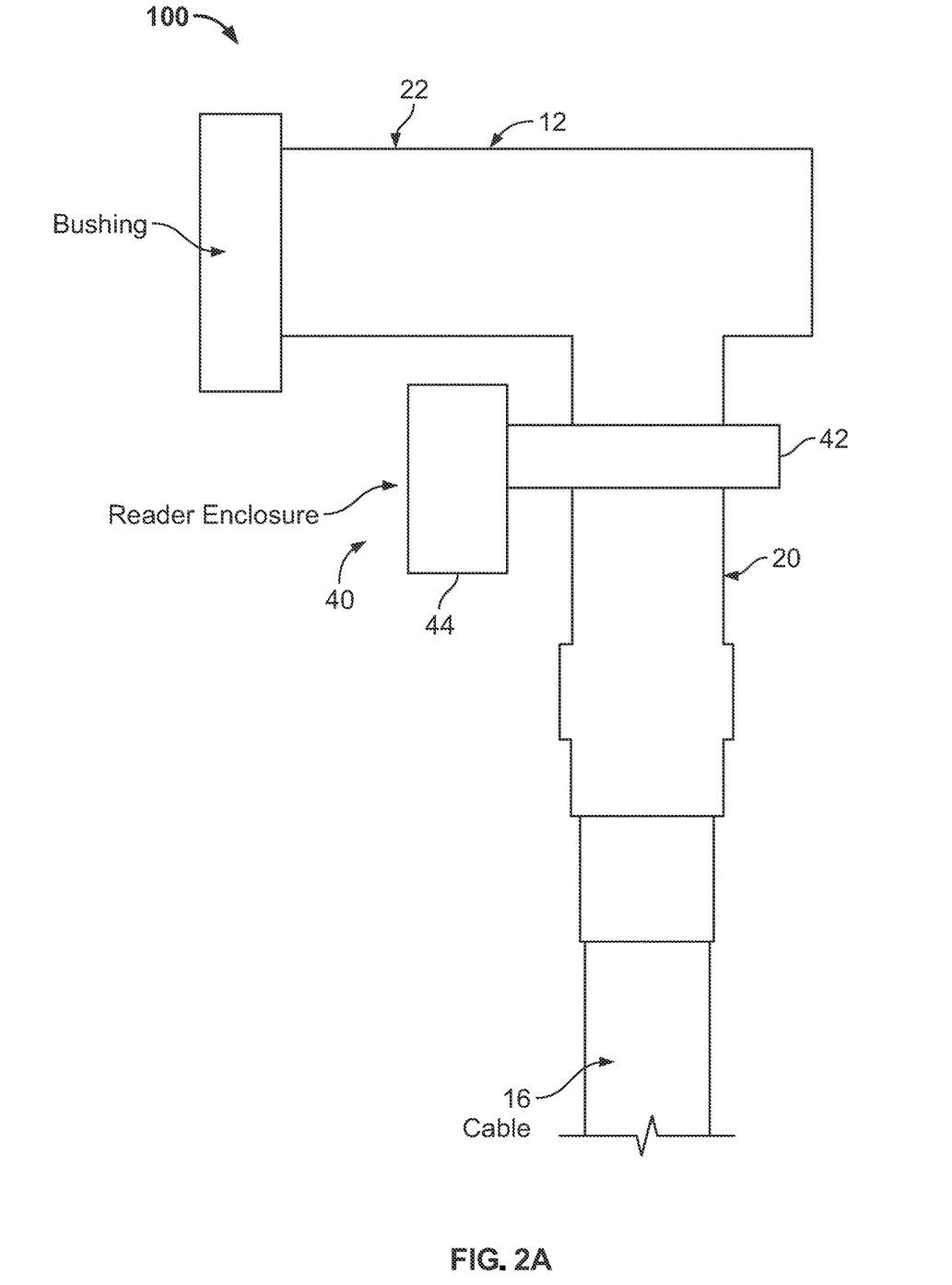
FIGS. 2A and 2B are schematic illustrations of a cable connection assembly according to some embodiments of the present inventive concept.
Figure 2B:
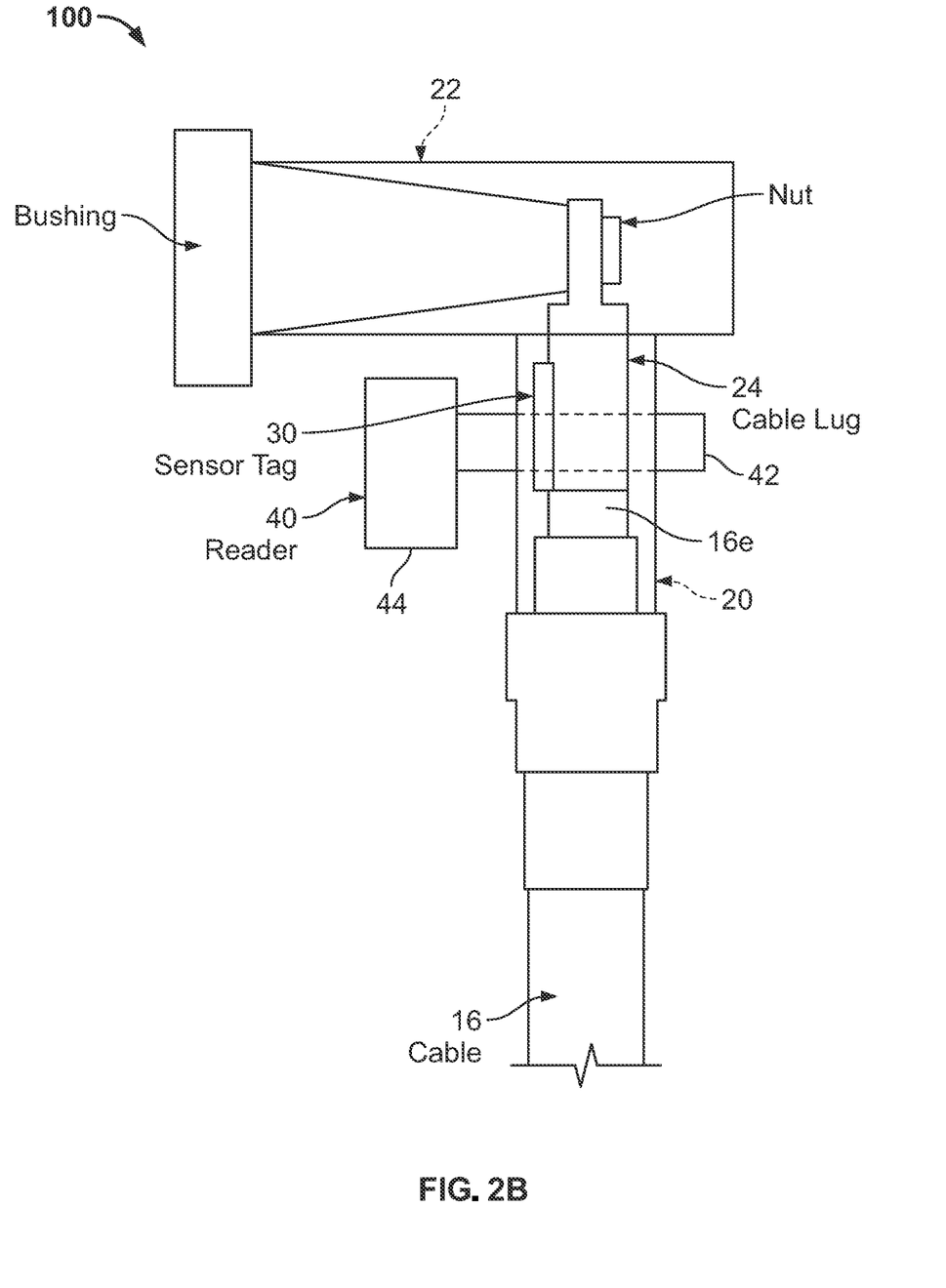

FIGS. 2A and 2B are schematic illustrations of a cable connection assembly 100, according to some embodiments of the present inventive concept. The cable connection assembly 100 includes an adaptor body 12, and a terminated electrical cable end 16*e* received within the adaptor body 12, as described above with respect to FIG. 1. The end 16*e* of the electrical cable 16 is terminated by a connector 24, such as a cable lug. A radio frequency (RF) sensor tag 30 is secured to the connector, and the RF sensor tag 30 includes a temperature sensor 32 and an antenna 34 (illustrated in FIG. 3B and FIGS. 5A-5B). In some embodiments, the RF sensor tag 30 may be configured to operate at temperatures up to about 150° C.

As used herein, RF is used to refer to a broad class of wireless communication interface that can provide communications and power, including far field communication and near field communication (NFC), which may utilize a specific communication protocol. Sensors based on RF technology have beneficial attributes, such as wireless readout, passive (battery-free) sensor operation, unique sensor identification, and onboard micro-processing capabilities. NFC includes but is not limited to the set of standard protocols defined by the NFC Forum industry association.

Figure 6:
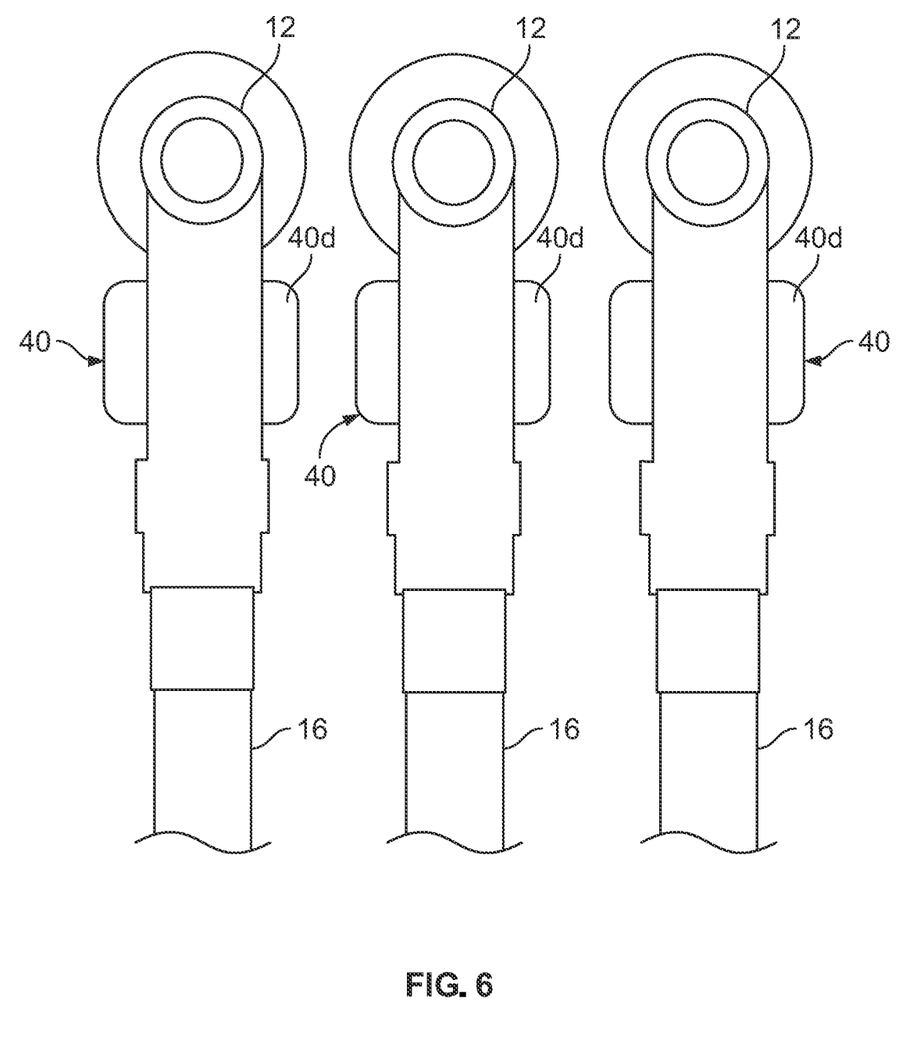
FIG. 6 is a schematic illustration of three cable connection assemblies, according to some embodiments of the present inventive concept.

An RF reader 40 is externally mounted on the adaptor body 12 and is configured to transmit an interrogation signal to the RF sensor tag 30 (FIG. 3B) that causes the temperature sensor 32 to detect a temperature of the connector 24 and generate a temperature data signal. The antenna 34 is configured to transmit the temperature data signal to the RF reader 40. The RF reader transmits the received temperature data signal to a remote device, such as a smart phone or other computing device, for display and/or storage. In some embodiments, the RF reader 40 may be configured to display an indication of a temperature of the connector 24 in response to receiving the temperature data signal. For example, as illustrated in FIG. 6, a portion 40*d* of an RF reader 40 may be configured to display one or more colors, each color associated with a specific range of temperatures. The RF reader 40 may also include a digital display and may be configured to display the temperature of the connector 24 directly. However, typically, the RF reader 40 will be facing away from a user and toward the equipment that the cable connection assembly 100 is attached to.

Figure 4:
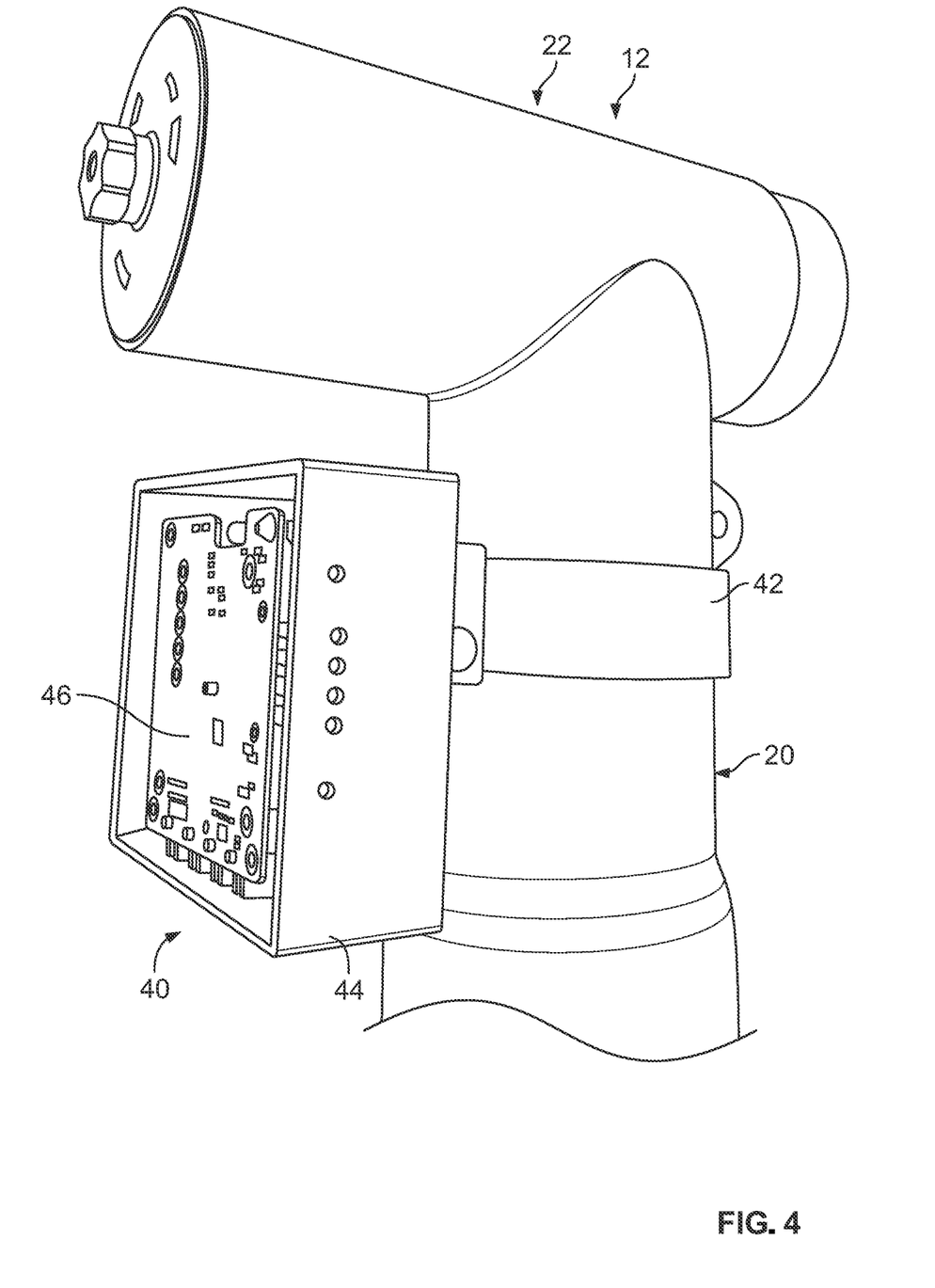
FIG. 4 illustrates an RF reader secured to an adaptor body of a cable connection assembly, according to some embodiments of the present inventive concept.

In some embodiments, the RF reader 40 is mounted on an exterior of the adaptor body 12 via a strap, bracket or other fastening mechanism 42, as illustrated in FIG. 4. A housing 44 contains the RF reader circuitry 46, which includes one or more processors and transceivers configured to interrogate a sensor tag and transmit a received data signal to an external device. The RF reader 40 is mounted in close proximity to the RF sensor tag 30 on the connector 24 so that NFC can be established. The RF reader 40 provides wireless power to the RF sensor tag 30 which accumulates and stores energy in small onboard capacitors. NFC protocol enables wireless communication between the RF sensor tag 30 and RF reader 40 at 13.56 MHz.

Figure 3A:
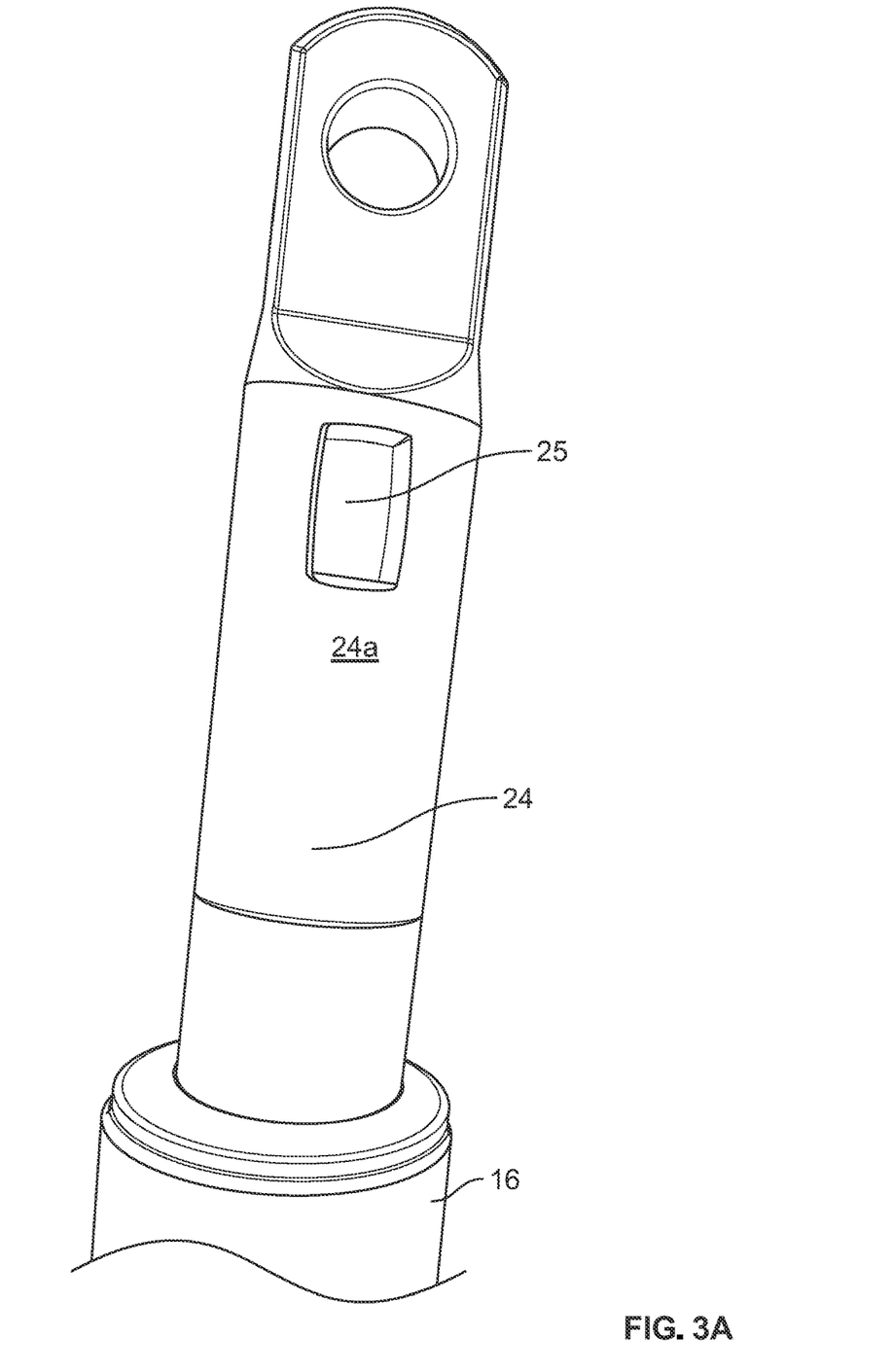
FIG. 3A illustrates a connector terminating an end of an electrical cable and containing a recessed portion configured to receive a temperature sensor, according to some embodiments of the present inventive concept.
Figure 3B:
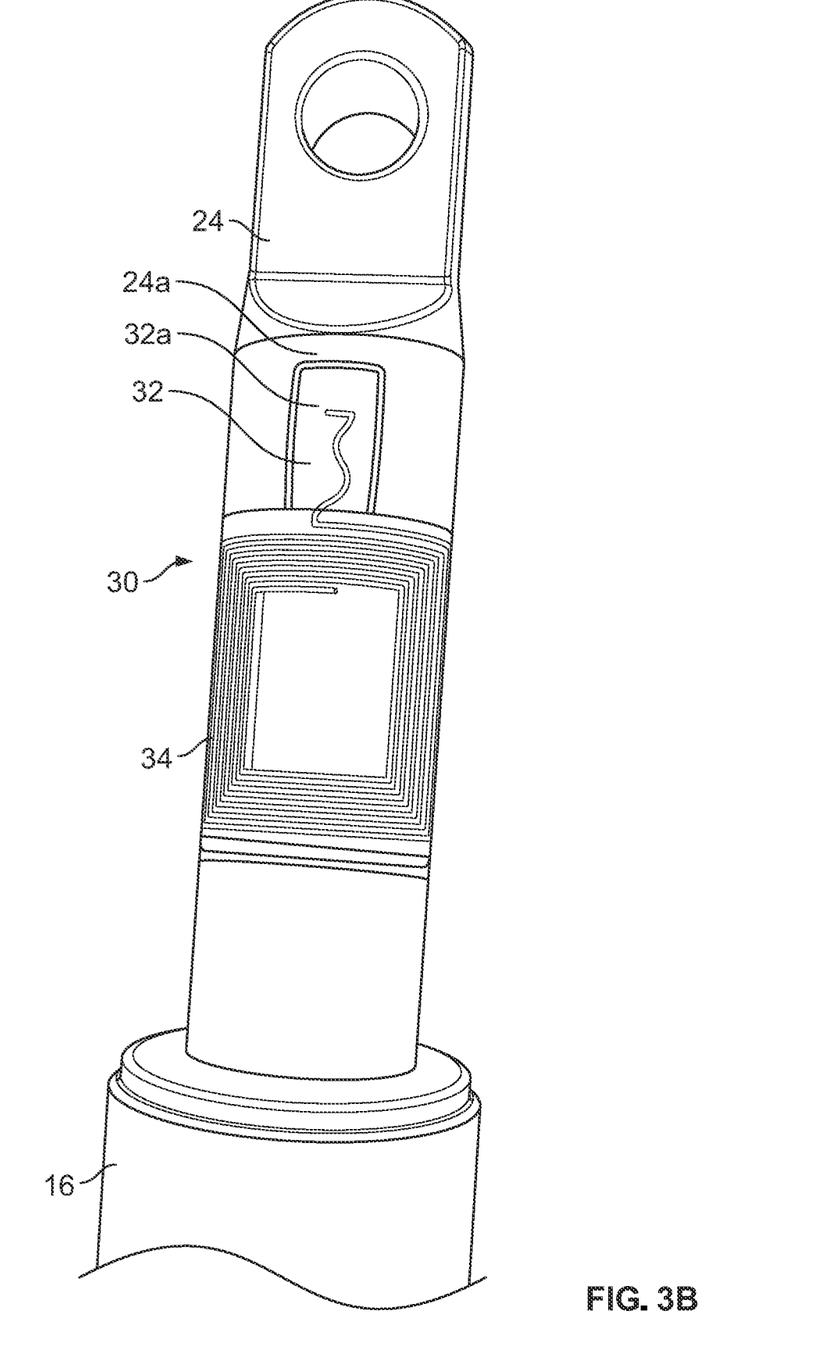
FIG. 3B illustrates the connector of FIG. 3A with a temperature sensor within the recessed portion and an RF antenna coupled to the temperature sensor and secured to an outer surface of the connector.

FIG. 3A illustrates an exemplary connector 24 secured to a high voltage electrical cable 16. The illustrated connector 24 is a cable lug. The outer surface 24*a* of the connector 24 includes a recessed portion 25. The temperature sensor 32 is positioned within the recessed portion 25, as illustrated in FIG. 3B, and the recessed portion 25 acts as a pocket to mechanically protect the temperature sensor 32. The antenna 34 is a flexible antenna that is secured to and conforms with the outer surface 24*a* of the connector 24, as illustrated in FIG. 3B. The antenna 34 is positioned adjacent the temperature sensor 32 and is electrically connected to the temperature sensor 32. Embodiments of the present inventive concept are not limited to the illustrated shape and size of the antenna 34. The antenna 34 may have various shapes, sizes and configurations without limitation.

In some embodiments, an outer surface 32*a* of the temperature sensor 32 does not extend above the outer surface 24*a* of the connector. For example, the outer surface 32*a* of the temperature sensor 32 may be recessed within the recessed portion 25 or may be substantially flush with the outer surface 24*a* of the connector 24. This allows the connector 24 to be inserted within the adaptor body 12 without mechanical interference from the temperature sensor 32. Moreover, due to its flexibility, the antenna 34 can be installed on the connector 24 in a low-profile format. As such, the recessed portion 25 that receives the temperature sensor 32 and the flexibility of the antenna 34 allows the senor tag 30 to easily fit under existing cable connection assemblies and accessories with no modification required.

In the illustrated embodiment, the recessed portion 25 has a generally rectangular shape to match the generally rectangular shape of the temperature sensor 32. However, embodiments of the present inventive concept are not limited to the illustrated shape and size of the temperature sensor 32 or the recessed portion 25. Each may have various shapes, sizes and configurations, without limitation.

Figure 5A:
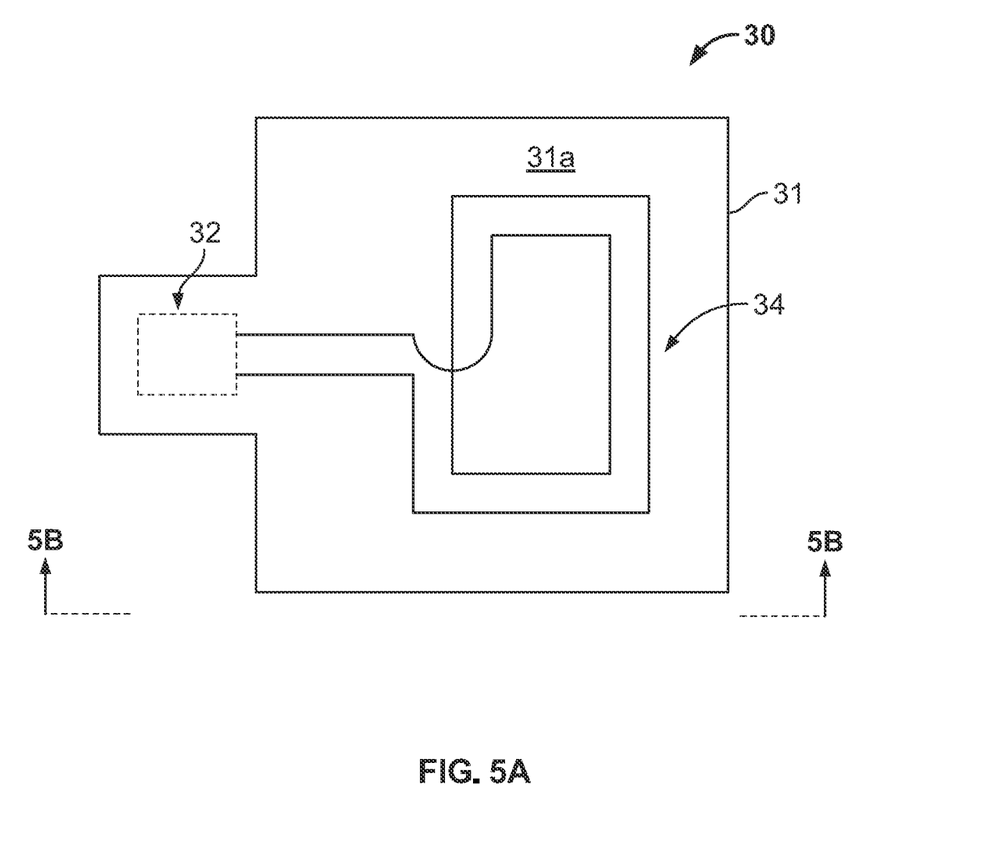
FIG. 5A is a schematic illustration of one embodiment of an RF sensor tag, according to the present inventive concept.
Figure 5B:
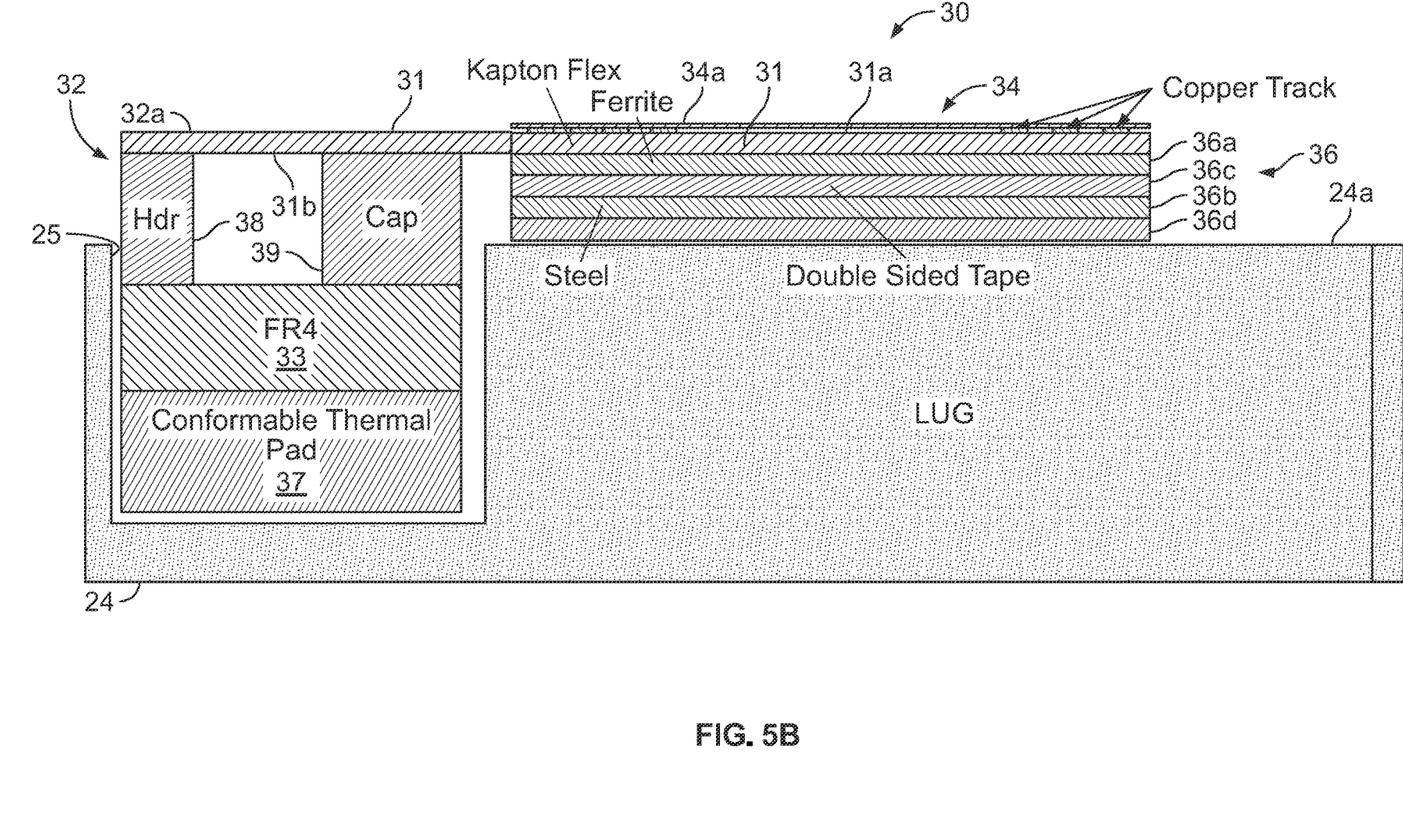
FIG. 5B is a side view of the sensor tag of FIG. 5A taken along line 5B-5B in FIG. 5A.

FIG. 5A is a schematic illustration of one embodiment of an RF sensor tag 30, according to the present inventive concept. FIG. 5B is a side view of the sensor tag 30 taken along line 5B-5B in FIG. 5A. The RF sensor tag 30 includes a substrate 31, a thermal sensing circuit 32 (i.e., temperature sensor) attached to a lower surface 31*b* of the substrate 31 (FIG. 5B), and an antenna 34 on an upper surface 31*a* of the substrate 31 that is electronically coupled to the thermal sensing circuit 32. The substrate 31 is flexible such that the sensor tag 30 can be attached to and conform with the outer surface 24*a* of a connector, such as connector 24 in FIGS. 3A-3B. In some embodiments, the substrate 31 is a flexible polymeric film, such as KAPTON® film, available from E.I. duPont de Nemours and company, Wilmington, Delaware.

Referring to FIG. 5B, the antenna 34 and thermal sensor 32 of the RF sensor tag 30 are illustrated in greater detail. The copper coil 34*a* of the antenna is attached to the flexible substrate 31. The antenna 34 also includes a shield 36 below the flexible substrate 31 that is positioned between the antenna 34 and the connector 24. The shield 36 is configured to reduce electromagnetic interference from the connector 24. The illustrated shield 36 includes a layer of ferrite 36a, such as, for example, a nickel-zinc ferrite or a manganese-zinc ferrite, and a layer of metallic material 36b, such as, for example, steel or other material with suitably high magnetic permeability. The metallic material layer 36b serves as a "shield" to the ferrite layer 36a to prevent the ferrite layer 36a from becoming saturated. The ferrite layer 36a isolates the antenna coil 34a from the magnetic surface of the connector 24. The ferrite layer 36a and metallic layer 36b are joined by a layer of double sided tape 36c, and another layer of double sided tape 36d is adhesively secured to the metallic layer 36b and adheres the antenna 34 to the connector 24.

In some embodiments, a combined thickness of the antenna 34 and shield 36 may be about 0.65 mm. The flexible film 31 upon which the copper coil 34a is secured may have a thickness of about 0.1 mm. The ferrite layer 36a may have a thickness of about 0.25 mm-0.35 mm, and the metallic layer 36b may have a thickness of about 0.1 mm. The double sided tape layers 36c, 36d may have a thickness of about 0.05 mm. However, the various layers may have different thicknesses and embodiments of the present invention are not limited to a particular thickness for any of the layers of the antenna 34 and shield 36.

Still referring to FIG. 5B, the thermal sensor 32 is illustrated positioned within the recessed portion 25 of the connector 24. In the embodiment of FIG. 5B, the upper surface 32a of the thermal sensor 32 extends above the outer surface 24a of the connector 24. However, it is understood that the upper surface 32a of the thermal sensor may be substantially flush with or recessed from the outer surface 24a of the connector 24 in other embodiments. In some embodiments, a combined thickness of the thermal sensor 32 may be about 3.6 mm. The illustrated thermal sensor 32 includes a circuit board 33 that contains thermal detecting circuitry. A thermal pad 37 is positioned between the circuit board 33 and the connector 24 in the recessed portion 25. The thermal pad 37 ensures good thermal conductivity between the connector 24 and the circuit board 33. The thermal pad 37 helps the thermal detecting circuitry on the circuit board 33 track the temperature of the connector as closely as possible. A pin header 38 connects the flexible substrate 31 to the less flexible circuit board 33; however, another type of connector could be utilized, also. A capacitor 39 is used to store the energy harvested from the RF field. This energy enables the sensor tag 30 to operate. In some embodiments, the circuit board 33 has a thickness of about 0.8 mm and the thermal pad 37 has a thickness of about 1 mm. However, the circuit board 33 and the thermal pad 37 may have different thicknesses and embodiments of the present invention are not limited to a particular thickness for either.

The RF reader 40 may be configured to adjust a frequency of the interrogation signal based on a temperature of the connector 24. For example, the RF reader 40 may "tune" the resonant frequency of the RF sensor tag 30 for an upper end of a normal expected operating temperature range, rather than ambient temperature.

The RF sensor tag 30 may also be configured to automatically adjust its operating frequency in response to a temperature of the connector detected by the temperature sensor 32. The sensor tag 30 includes a small microprocessor to perform this function.

Figure 7:
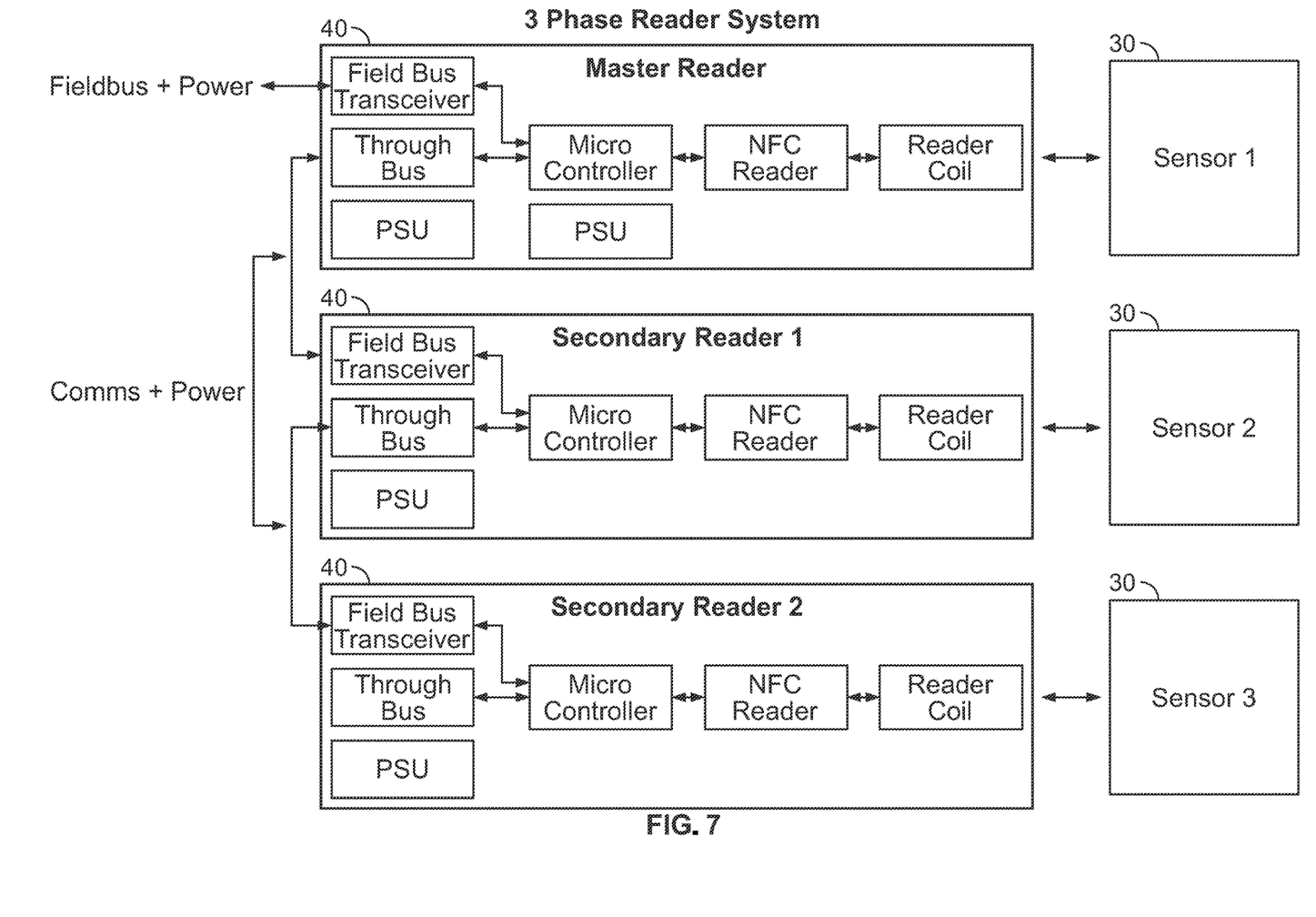
FIG. 7 is a schematic illustration of a three phase RF reader system, according to some embodiments of the present inventive concept.

Referring to FIGS. 6 and 7, multiple RF readers 40 can be daisy-chained, allowing data to be collected from three (or more) phases simultaneously, thereby allowing the collected data to highlight differences between phases, or trends common to all phases.

Figure 8:
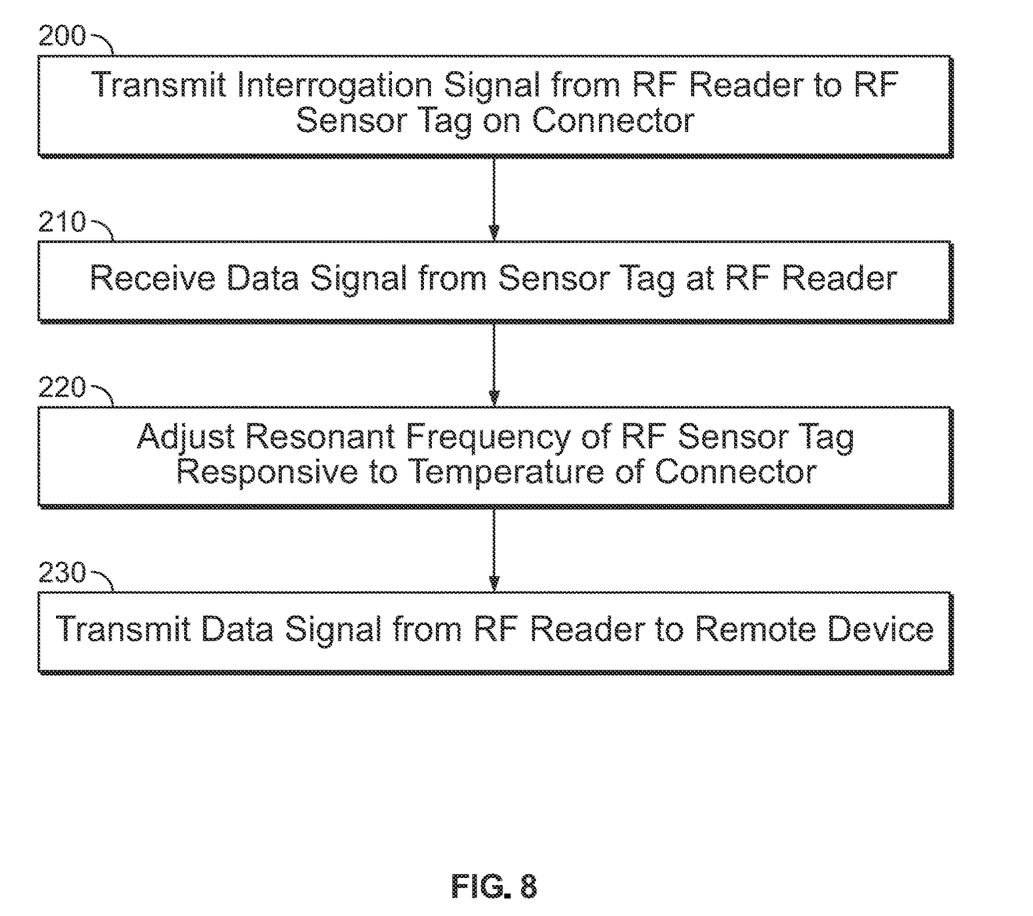
FIG. 8 is a flow diagram of operations for monitoring a temperature of a connector terminating an end of an electrical cable, according to some embodiments of the present inventive concept.

Referring to FIG. 8, a method of monitoring a temperature of a connector terminating an end of an electrical cable is illustrated. The illustrated operations may be performed by one or more processors associated with RF reader 40. The RF reader 40 transmits an interrogation signal to the RF sensor tag 30 (Block 200). This interrogation signal causes the temperature sensor to detect a temperature of the connector and generate a temperature data signal, and causes the antenna to transmit the temperature data signal. The RF reader 40 receives the transmitted data signal (Block 210). In some embodiments, one or more processors associate with the RF reader or sensor tag may adjust a resonant frequency of the sensor tag in response to the temperature of the connector (Block 220). The RF reader may also transmit the received data signal to a remote device, such as a smart phone or other computing device for display (Block 230).

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

Example embodiments are described herein with reference to block diagrams and flow diagrams. It is understood that a block of the block diagrams and flow diagrams, and combinations of blocks in the block diagrams and flow diagrams, can be implemented by computer program instructions that are performed by one or more computer circuits, such as electrical circuits having analog and/or digital elements. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and flow diagrams, and thereby create means (functionality) and/or structure for implementing the functions/acts specified in the block diagrams and flow diagrams.

It should also be noted that the functionality of a given block of the block diagrams and flow diagrams may be separated into multiple blocks and/or the functionality of two or more blocks of the block diagrams and flow diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

That which is claimed is:

1. A cable connection assembly, comprising:
    an adaptor body;
    a terminated electrical cable end received within the adaptor body, the electrical cable end terminated by a connector;
    a radio frequency (RF) sensor tag secured to the connector, the RF sensor tag comprising a temperature sensor and an antenna; and
    an RF reader externally mounted on the adaptor body, wherein the RF reader is configured to transmit an interrogation signal to the RF sensor tag that provides power to the RF sensor tag and causes the temperature sensor to detect a temperature of the connector and generate a temperature data signal, and that causes the antenna to transmit the temperature data signal, and wherein the RF reader is configured to receive the transmitted temperature data signal.

2. The cable connection assembly of claim 1, wherein the antenna is a flexible antenna that is secured to and conforms with an outer surface of the connector.

3. The cable connection assembly of claim 1, wherein the RF reader is further configured to transmit the received temperature data signal to a remote device.

4. The cable connection assembly of claim 1, wherein the RF reader is further configured to display an indication of a temperature of the connector in response to receiving the temperature data signal.

5. The cable connection assembly of claim 1, wherein the RF reader is further configured to adjust a frequency of the interrogation signal based on a temperature of the connector.

6. The cable connection assembly of claim 1, wherein the RF sensor tag is configured to adjust its operating frequency in response to a temperature of the connector detected by the temperature sensor.

7. The cable connection assembly of claim 1, wherein the connector is a cable lug.

8. The cable connection assembly of claim 1, wherein the RF reader is externally mounted on the adaptor body via a strap, bracket, or other fastening mechanism.

9. The cable connection assembly of claim 1, wherein an outer surface of the connector comprises a recessed portion, and wherein the temperature sensor is positioned within the recessed portion.

10. The cable connection assembly of claim 9, wherein an outer surface of the temperature sensor does not extend above the outer surface of the connector.

11. The cable connection assembly of claim 1, wherein the antenna comprises a shield configured to reduce electromagnetic interference from the electrical cable, wherein the shield comprises a layer of ferrite and a layer of metallic material.

12. The cable connection assembly of claim 11, wherein the layer of metallic material is adjacent to an outer surface of the connector, and the layer of ferrite is between the layer of metallic material and the antenna.

13. A connector terminating an end of an electrical cable, the connector comprising:
    an outer surface; and
    a radio frequency (RF) sensor tag secured to the connector outer surface, the RF sensor tag comprising a temperature sensor and an antenna;
    wherein, in response to the RF sensor tag receiving an interrogation signal from a remote RF reader, the temperature sensor is configured to detect a temperature of the connector and generate a temperature data signal, and the antenna is configured to transmit the temperature data signal to the remote RF reader, and
    wherein the RF sensor tag is configured to automatically adjust its operating frequency in response to a temperature of the connector detected by the temperature sensor.

14. The connector of claim 13, wherein an outer surface of the connector comprises a recessed portion, and wherein the temperature sensor is positioned within the recessed portion.

15. The connector of claim 13, wherein the antenna is a flexible antenna that is secured to and conforms with an outer surface of the connector.

16. The connector of claim 13, wherein the antenna comprises a shield configured to reduce electromagnetic interference, wherein the shield comprises a layer of ferrite and a layer of metallic material.

17. A method of monitoring a temperature of a connector terminating an end of an electrical cable, wherein the connector is surrounded by an insulative adaptor body, wherein a radio frequency (RF) sensor tag is secured to the connector, the RF sensor tag comprising a temperature sensor and an antenna, the method comprising:
    transmitting an interrogation signal to the RF sensor tag from an RF reader located external to the adaptor body that provides power to the RF sensor tag and causes the temperature sensor to detect a temperature of the connector and generate a temperature data signal, and the antenna to transmit the temperature data signal, wherein an operating frequency of the RF sensor tag is adjusted in response to a temperature of the connector detected by the temperature sensor; and receiving the transmitted data signal at the RF reader.

18. The method of claim 17, further comprising transmitting the received temperature data signal from the RF reader to a remote device.

19. The method of claim 17, wherein the RF sensor tag is configured to automatically adjust its operating frequency in response to the temperature of the connector detected by the temperature sensor.

* * * * *